(12) United States Patent
Shibutani et al.

(10) Patent No.: US 7,343,089 B2
(45) Date of Patent: Mar. 11, 2008

(54) INFORMATION PROCESSING APPARATUS FOR EXECUTING FORMAT CONVERSION

(75) Inventors: Manabu Shibutani, Yokohama (JP); Hiroaki Unno, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1278 days.

(21) Appl. No.: 10/290,457

(22) Filed: Nov. 8, 2002

(65) Prior Publication Data

US 2003/0091342 A1 May 15, 2003

(30) Foreign Application Priority Data

Nov. 9, 2001 (JP) .............................. 2001-345303

(51) Int. Cl.
*H04N 7/01* (2006.01)
(52) U.S. Cl. .................................................. 386/131
(58) Field of Classification Search ................ 386/131, 386/126, 98
See application file for complete search history.

(56) References Cited

U.S. PATENT DOCUMENTS

| 6,272,286 | B1* | 8/2001 | Asada et al. ................ 386/126 |
| 6,718,510 | B2* | 4/2004 | Kojima ........................ 714/784 |
| 6,868,125 | B2* | 3/2005 | Gendel ................... 375/240.26 |
| 6,873,629 | B2* | 3/2005 | Morris ........................ 370/535 |
| 7,099,561 | B1* | 8/2006 | Lin et al. ...................... 386/95 |
| 2002/0039485 | A1* | 4/2002 | Fujita et al. ................. 386/125 |
| 2002/0041754 | A1* | 4/2002 | Kikuchi et al. ............... 386/46 |

FOREIGN PATENT DOCUMENTS

| JP | 8-336104 | 12/1996 |
| JP | 11-215466 A | 8/1999 |
| JP | 11-288562 A | 10/1999 |
| WO | WO95/23411 | 8/1995 |
| WO | WO00/46803 | 8/2000 |
| WO | WO 01/15168 A1 | 3/2001 |

* cited by examiner

*Primary Examiner*—Thai Q. Tran
*Assistant Examiner*—Anner Holder
(74) *Attorney, Agent, or Firm*—Pillsbury Winthrop Shaw Pittman, LLP

(57) ABSTRACT

An information processing apparatus comprises an encoder for encoding predetermined information into first video information $ST_1$ based on a first format, an insertion section for inserting conversion information VOBU_2NDREF_EA, VOBU_3RDREF_EA, VOBU_A_SYNCA into the first video information, the conversion information being used to encode the first video information into second video information $ST_2$ based on a second format, the conversion information being free from influencing reproduction of the first video information based on the first format, and a recording section for recording the first video information containing the conversion information on an information recording medium D.

8 Claims, 5 Drawing Sheets

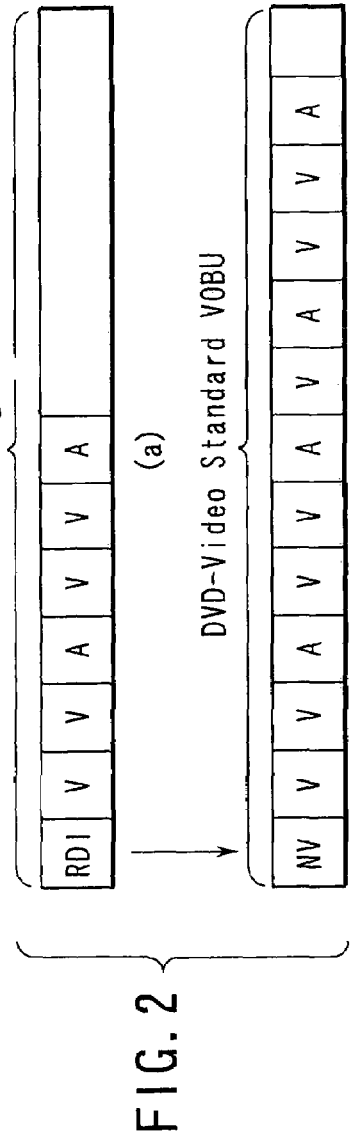

| Field name | Contents | Byte length |
|---|---|---|
| (1) NV_PCK_SCR | SCR_base of NV_PCK | 4 bytes |
| (2) NV_PCK_LBN | LBN of NV_PCK | 4 bytes |
| (3) VOBU_EA | End address of VOBU | 4 bytes |
| (4) VOBU_1STREF_EA | End address of the first Reference Picture in VOBU | 4 bytes |
| (5) VOBU_2NDREF_EA | End address of the secondt Reference Picture in VOBU | 4 bytes |
| (6) VOBU_3RDREF_EA | End address of the third Reference Picture in VOBU | 4 bytes |
| (7) VOBU_VOB_IDN | VOB ID number of the VOBU | 2 bytes |
| reserved | reserved | 1 bytes |
| (8) VOBU_C_IDN | Cell ID number of the VOBU | 1 bytes |
| (9) C_ELTM | Cell Elapse Time | 4 bytes |
| (10) A_SYNCA 0 to 7 | Target Audio pack (A_PCK) address | 2 bytes×8 |
| (11) SP_SYNCA 0 to 31 | VOBU start address for Target Sub-picture pack(SP_PCK) | 4 bytes×32 |

NV_PCK (partial extraction)

RDI_PCK

| Field name | Byte length | Value | Contents |
|---|---|---|---|
| packet_start_code_prefix | 3 | 00 00 01h | |
| stream_id | 1 | 1011 1111b | private_stream 2 |
| PES_packet_length | 2 | 07D4h | |
| | | | Private data area |
| sub_stream_id | 1 | 0101 000b | |
| | | | RDI_GI/DCI_CCI |
| RDI_GI | 16 | | |
| DDI_CCI | 8 | | |
| | | MNFI (1979 byte) | |
| reserved | 3 | 000000h | from DVD_VR format book |
| MNF_ID | 32 | | "DVD-Video info" after this are blank "20h" |
| reserved | 2 | 0000h | Alignment |
| VERSION | 2 | 0100h | Version 1.0 |
| reserved | 3 | 000000h | Alignment |
| VOBU_2NDREF_EA | 4 | | Final address of second reference picture for NV_PCK–>DSI–>DSI_GI–>VOBU_2NDREF_EA |
| VOBU_3RDREF_EA | 4 | | Final address of third reference picture for NV_PCK–>DSI–>DSI_GI–>VOBU_3RDREF_EA |
| reserved | 2 | 0000h | Alignment |
| VOBU_A_SYNCA | 2 | | Address of A_PCK including audio frame reproduced immediately after video start time, for NV_PCK–>DSI–>SYNCI–>A-SYNCA0 |
| PIC_TYPE0 | 1 | | Type of picture data I, P, B |
| PIC_ADDR0 | 4 | | Start address of picture data |
| PIC_LENGTH0 | 4 | | Length of picture data |
| PIC2 ~ PIC13 | ... | | |
| PIC_TYPE14 | 1 | | |
| PIC_ADDR14 | 4 | | |
| PIC_LENGTH14 | 4 | | |
| reserved | 1790 | | |

FIG. 3

INFORMATION PROCESSING APPARATUS FOR EXECUTING FORMAT CONVERSION

CROSS-REFERENCE TO RELATED APPLICATIONS

This application is based upon and claims the benefit of priority from the prior Japanese Patent Application No. 2001-345303, filed Nov. 9, 2001, the entire contents of which are incorporated herein by reference.

BACKGROUND OF THE INVENTION

1. Field of the Invention

The present invention relates to an information processing apparatus, and more particularly to an information processing apparatus in which processing information used for format conversion or editing processing is inserted in a video signal.

2. Description of the Related Art

In accordance with the spread of, for example, DVDs (Digital Versatile Disks), video signals are now recorded/reproduced on/from disks or edited using various standards. When video signals are recorded by, for example, DVD recording/reproduction apparatuses, the DVD-VR (Video-Recording) standard (hereinafter referred to simply as the "VR standard") is utilized. On the other hand, in usual DVD reproduction apparatuses (DVD players), video signals recorded using the DVD-V (Video) standard (hereinafter referred to simply as the "V standard") are reproduced.

Thus, video signals recorded by DVD recording/reproduction apparatuses utilizing the VR standard cannot be reproduced by usual DVD players. If a user would like to reproduce, using a usual DVD player, a wedding videotape, for example, recorded on the basis of the VR standard, it is necessary to convert it into a video signal tape based on the V standard. However, there is no publication that specifies this conversion process in detail.

In the prior art, a data stream based on the VR standard cannot be reproduced by reproduction apparatuses based on the V standard, since the V standard and VR standard are not compatible with each other. Further, to convert VR-standard data into V-standard data, a large amount of calculation is required. To convert video data of, for example, about 2 hours, at least several hours are required.

BRIEF SUMMARY OF THE INVENTION

It is an object of the invention to provide an information processing apparatus in which the information required for format conversion is recorded when a video signal stream that may be subjected to format conversion is recorded, in order to reduce the amount of calculation for conversion, thereby enabling conversion within a practical time period.

According to an aspect of the invention, there is provided an information processing apparatus which inserts conversion information, used for conversion of a first format into a second format, into predetermined information, when recording the predetermined information as video information based on the first format, comprising: an encoder which encodes the predetermined information into first video information based on the first format; an insertion section which inserts the conversion information into the first video information encoded by the encoder, the conversion information being used to encode the first video information into second video information based on a second format differing from the first format; and a recording section which record the first video information, in which the conversion information is inserted by the insertion section, on a storage area of an information recording medium.

According to another aspect of the invention, there is provided an information processing apparatus which converts first video information based on a first format into second video information based on a second format with reference to conversion information inserted in the first video information based on the first format, comprising an extraction section which extracts the conversion information from the first video information based on the first format, in which the conversion information is inserted; and a conversion section which converts the first video information into second video information different from the first format, with reference to the conversion information extracted by the extraction section.

The information processing apparatus according to the first-mentioned aspect has an insertion section for inserting, when encoding input information into first video information, conversion information used to encode the first video information into second video information based on a second format, the conversion information being free from influencing reproduction of the first video information based on the first format. This conversion information is inserted into the first video information in consideration of future conversion of the first video information into the second video information. The resultant first information that contains the conversion information is recorded on a recording medium.

In the second-mentioned information processing apparatus, the inserted conversion information enables the first video information based on the first format to be reliably converted into the second video information in a practical time period. Therefore, if someone executes, using their own editing apparatus, format conversion on V-standard video data concerning, for example, a wedding ceremony obtained by a digital video camera, and downloads the resultant video data (V standard) to a plurality of DVD-Rs, the video data, which can be reproduced by a usual DVD player, can be distributed to their acquaintances.

BRIEF DESCRIPTION OF THE SEVERAL VIEWS OF THE DRAWING

FIG. 2 is a view useful in explaining the structures of the VR standard "VOBU" and V standard "VOBU" to be processed by the format conversion function employed in the first embodiment;

FIG. 3 is a view illustrating an example of RDI_PCK containing information for format conversion in which the first embodiment is characterized;

FIG. 4 is a view illustrating NV_PCK of the V standard obtained by the format conversion function of the invention;

DETAILED DESCRIPTION OF THE INVENTION

Reference will now be made in detail to embodiments of the invention as illustrated in the accompanying drawings.

Configuration Example of Optical Disk Recording/Reproduction Apparatus

Figure 1:
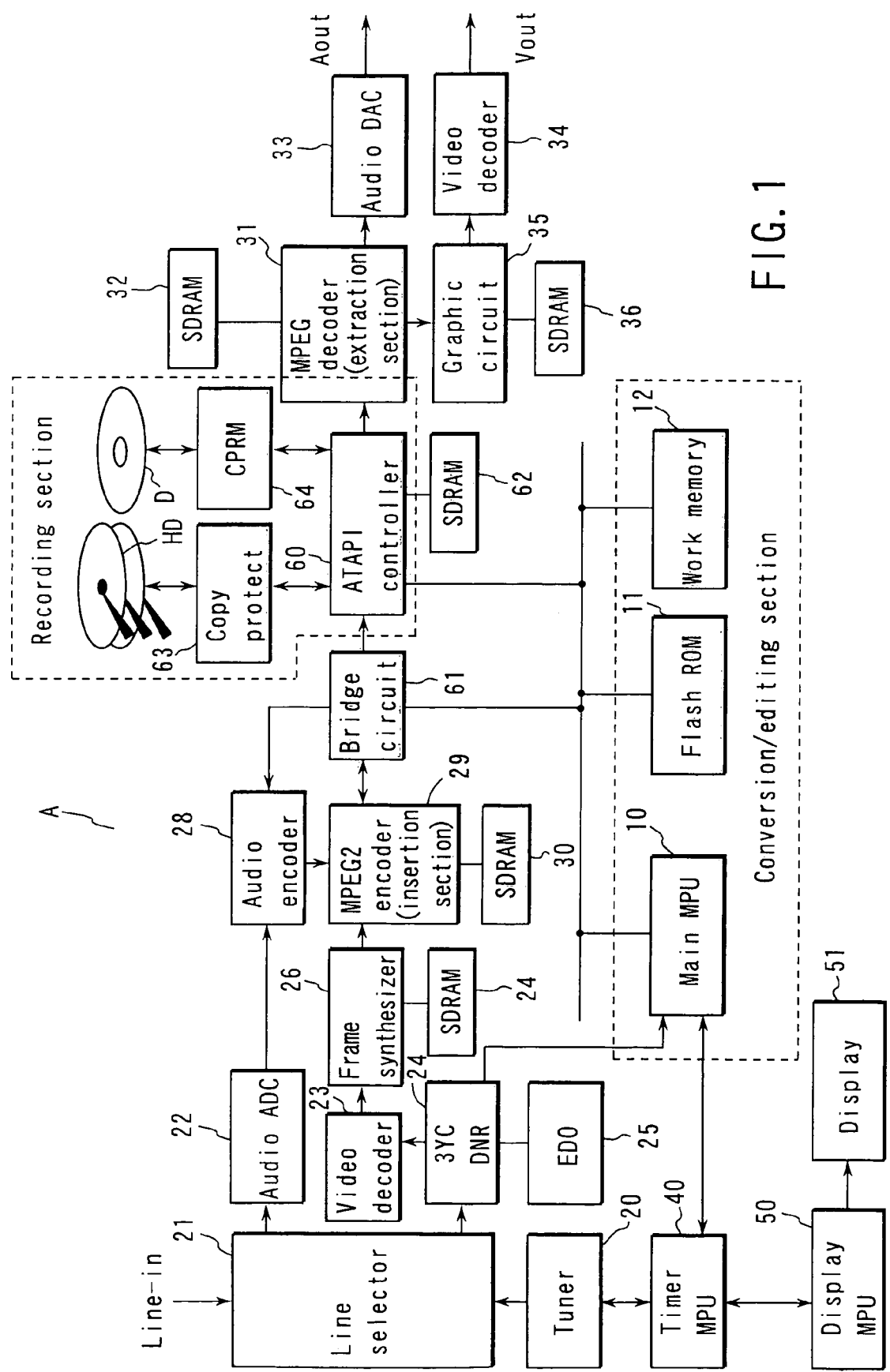
FIG. 1 is a block diagram illustrating a configuration example of an optical disk recording/reproduction apparatus having a format conversion function and editing function, according to a first embodiment of the invention.
Figure 5:
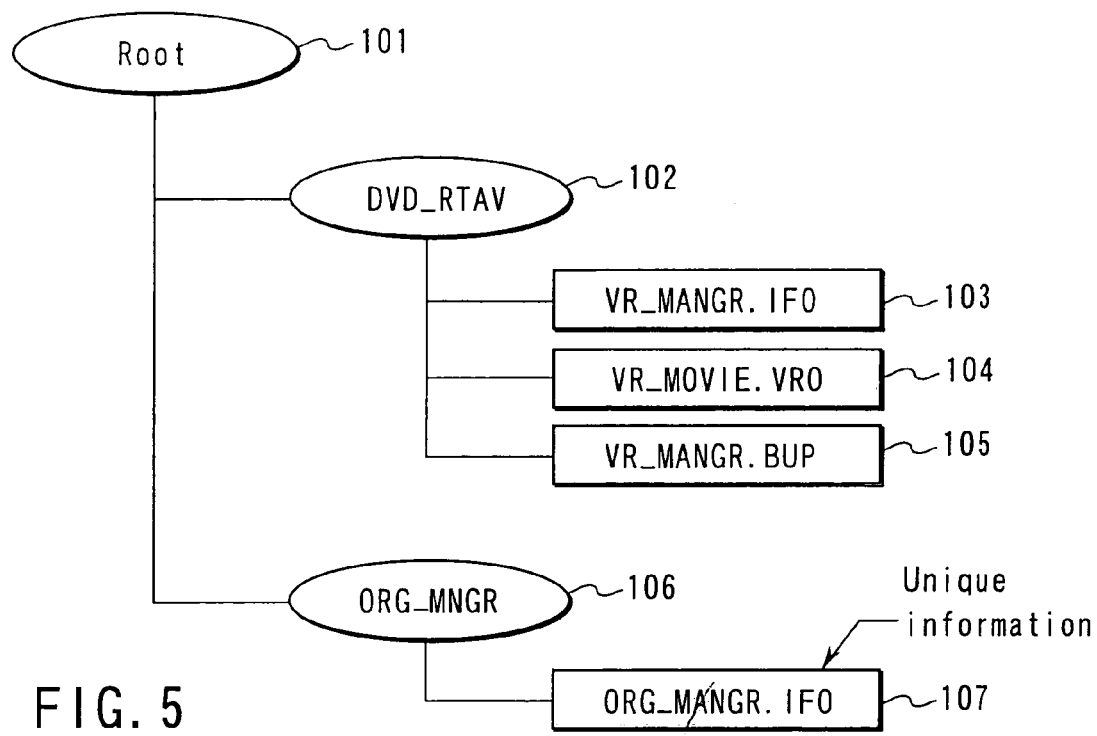
FIG. 5 is a view illustrating a file configuration having ORG_MNGR containing information for format conversion in which a second embodiment is characterized.
Figure 7:
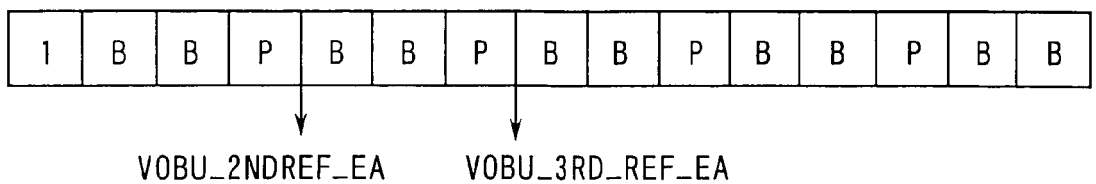
FIG. 7 is a view useful in explaining address positions indicated by VOBU_2NDREF_EA and VOBU_3RDREF_EA used in the format conversion function of the invention.
Figure 6:
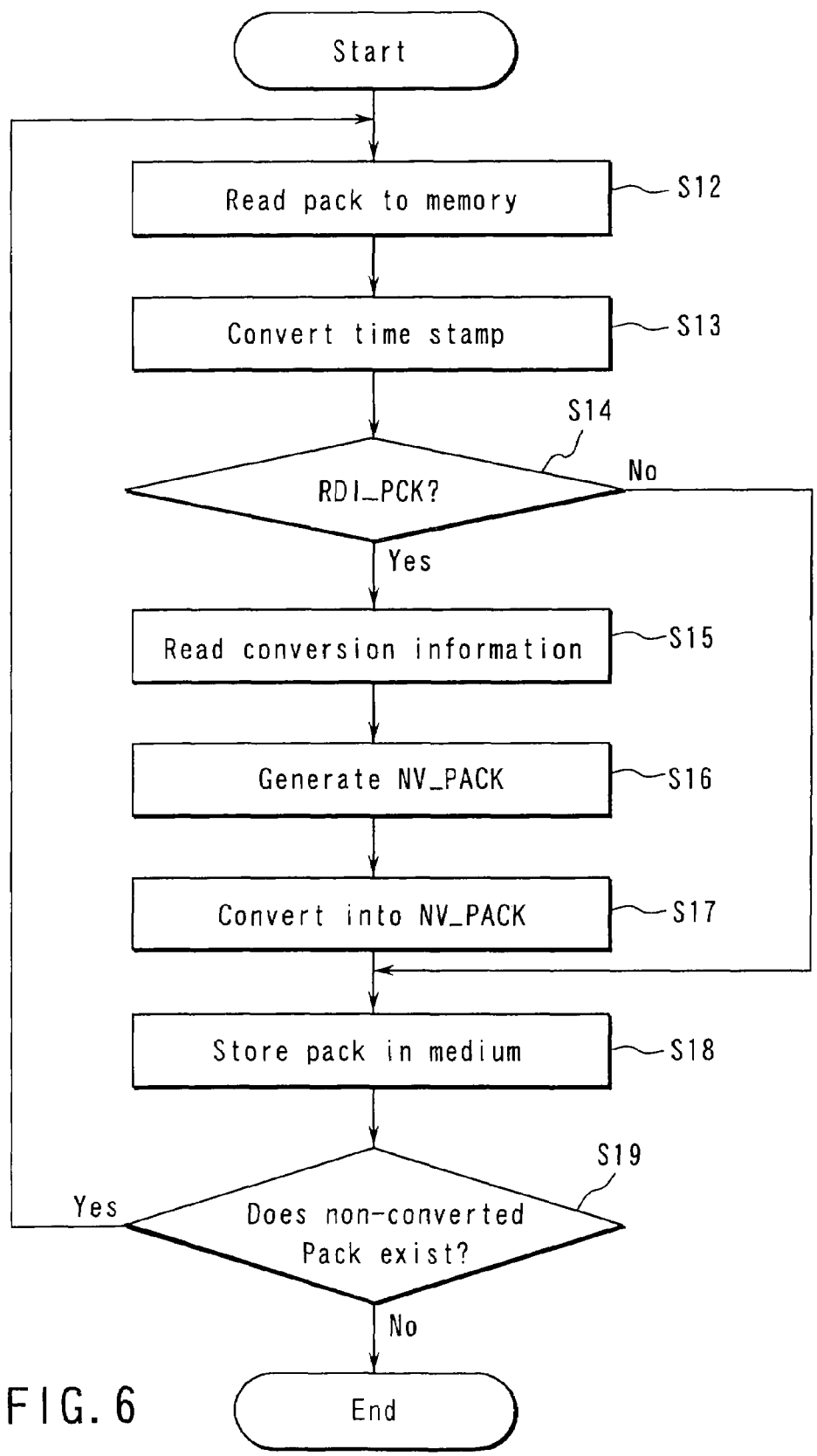
FIG. 6 is a flowchart useful in explaining the procedure of format conversion from the VR standard to the V standard, according to the second embodiment.

FIG. 1 is a block diagram illustrating a configuration example of an optical disk recording/reproduction apparatus having a format conversion function and editing function, according to a first embodiment of the invention; FIG. 2 is a view useful in explaining the structures of the VR standard "VOBU" and V standard "VOBU" to be processed by the format conversion function employed in the first embodiment; FIG. 3 is a view illustrating an example of RDI_PCK containing information for format conversion in which the first embodiment is characterized; FIG. 4 is a view illustrating NV_PCK of the V standard obtained by the format conversion function of the invention; FIG. 5 is a view illustrating a file configuration having ORG_MNGR containing information for format conversion in which a second embodiment is characterized; FIG. 6 is a flowchart useful in explaining the procedure of format conversion from the VR standard to the V standard, according to the second embodiment; and FIG. 7 is a view useful in explaining address positions indicated by VOBU_2NDREF_EA and VOBU_3RDREF_EA used in the format conversion function of the invention.

The entire operation of the optical disk recording/reproduction apparatus A shown in FIG. 1 is controlled by a main MPU 10 connected to a flash ROM 11 and work memory 12 via a data bus. A configuration for realizing a function for mainly recording video information on hard disks HD and optical disk D comprises a line selector 21 connected to a tuner 20 and line-in, audio AV converter 22 for receiving a signal from the selector 21, a video decoder 23 for receiving a video signal via a 3YCDNR 24 with an EDO 25, and frame synchronizer 26 with an SDRAM 27, which receives a frame signal from the decoder 23. The configuration further comprises an audio encoder 28 for encoding an audio signal from the audio AD converter 22, and MPEG2 encoder 29 with an SDRAM 30, which receives a video signal from the frame synchronizer 26 and encodes an MPEG signal. The aforementioned hard disks HD and optical disk D, which record to-be-recorded video information, are connected to the configuration via a copy protect 63 and CPRM 64, respectively.

The tuner 20 is controlled by a timer MPU 40. Similarly, a display 51 is controlled by the timer MPU 40 and a display MPU 50.

A configuration for realizing a reproduction function comprises the aforementioned hard disk drive HD connected via the copy protect 63, and the optical disk D connected via the CPRM 64, which serve as video signal storage areas. This configuration further comprises an ATAPI controller 60 for processing a read video signal, MPEG decoder 31 with an SDRAM 32 for decoding a video signal supplied from the controller 60, graphic circuit 35 with an SDRAM 36, video decoder 34 for decoding a video signal supplied from the graphic circuit 35, and audio DA converter 33 for DA converting an audio signal supplied from the MPEG decoder 31. Further, a bridge circuit 61 is provided for interfacing the recording function with the reproduction function. The bridge circuit 61 is controlled by the main MPU.

The MPEG2 encoder 29 may contain an insertion section, and the MPEG decoder 31 may contain an extraction section. Furthermore, a conversion/editing section contains the main MPU 10, flash ROM 11, and work memory 12, and a recording section contains the hard disk drive HD, optical disk D, copy protect 63, DPRM 64 and ATAPI 60.

First Embodiment

A first embodiment of the invention is directed to an information processing apparatus for inserting format conversion information or editing information into a video data stream obtained before conversion, such as PDI_PCK, and recording the resultant data. The first embodiment is also directed to an information processing apparatus for executing format conversion and editing processing.

In the optical disk recording/reproduction apparatus constructed as above, shown in FIG. 1, the main MPU 10 determines, when recording an MPEG stream, whether or not there is a possibility, in near future, of the stream being subjected to format conversion or editing processing. If there is, the information necessary for format conversion or editing processing is recorded together with the MPEG stream. It is necessary to record the information in an area in which the stream can be freely written without influencing reproduction.

When writing information to such an area in the stream, the main MPU 10 beforehand executes necessary setting in the MPEG encoder 29. Upon receiving an instruction to start recording, the MPEG encoder 29 executes encoding while recording the information in the stream, using the set parameters.

FIG. 2 is a view useful in explaining the conversion from the VR standard to the V standard, which is an example of format conversion that the present invention executes. Specifically, FIG. 2 shows a V-standard stream, VOBU ($ST_1$), and a V-standard stream, VOBU ($ST_2$). The invention provides conversion information for converting VR-standard RDI_PCK into V-standard NV_PCK, which seems most difficult.

FIG. 3 shows an example of a specific structure of VR-standard RDI_PCK. In this case, it is assumed that recorded VR-standard data will be converted into V-standard data in near future. The data, in which the invention is characterized, includes MNF_ID as a flag indicative of whether or not the conversion information or editing information of the invention exists in a predetermined storage area, and VERSION indicative of the type of conversion information. The data also includes VOBU_2NDREF_EA as the final address of the second reference picture, VOBU_3RDREF_EA as the final address of the third reference picture, and VOBU_A_SYNCA as the address of A_PCK containing an audio frame to be reproduced immediately after a video start time. These data items are used to construct V-standard NV_PCK when format conversion is executed. FIG. 7 shows the address positions of VOBU_2NDREF_EA, VOBU_3RDREF EA and VOBU_A_SYNCA in VOBU.

Further, in order not to shorten the time required for format conversion processing, but also to facilitate editing processing such as change of the order of a plurality of data streams, when a video time period is recorded, PIC_TYPE0 is supplied as identification data that indicates the type of picture information to be edited, i.e., I or P or B, and PIC_ADDR and PIC_LENGTH that indicate the position and length of a picture, respectively, are supplied.

This enables the type of picture information to be specified, thereby realizing accurate editing processing.

In addition, the aforementioned MNF_ID or VERSION can be also used as reference information for editing processing, as well as for format conversion processing.

FIG. 4 shows the structure of V-standard NV_PCK, in which NV_PCK_SCR, NV_PCK_LBN, VOBU_EA, VOBU_1STREF_EA, VOBU_2NDREF_EA, VOBU_3RDREF_EA, VOBU_VOB_IDN, VOBU_C_IND, C_ELTM, A_SYNCA and SP_SYNCA indicate a time period contained in the navi-pack, the position of the navi-pack, the length of the vob-unit, the final address of the first reference picture, the final address of the second reference picture, the final address of the third reference picture, the ID of the vob-unit, the ID of a cell, the display time period in the cell, the address of audio data, and the address of a sub-picture corresponding to video, respectively.

If the final addresses of the first to third reference pictures VOBU_1STREF_EA, VOBU_2NDREF_EA and VOBU_3RDREF_EA are calculated, a lot of time is required. However, in the embodiment, they are supplied in advance as conversion information, which reduces the time required for actual format conversion.

(Description of Conversion Processing and Editing Processing)

Referring now to the flowchart of FIG. 6, a detailed description will be give of format conversion processing executed using video information in which conversion and editing information is inserted. In this example, a VR-standard stream recorded on a magnetic recording medium D is converted into a V-standard stream, and the resultant stream is recorded on an optical disk medium D.

Upon receiving an instruction to execute format conversion issued from a user, the optical disk recording/reproduction apparatus A reads a data stream of one pack, to be subjected to format conversion, from the hard disk drive HD into the work memory 12 (S12). After the read data pack is subjected to time stamp conversion (S13), the main MPU 10 determines whether or not it is RDI_PCK (S14). If it is RDI_PCK (YES at S14), it is necessary to convert the pack into NV_PCK. Accordingly, the above-described conversion information, i.e., the address information VOBU_2NDREF_EA and VOBU_3RDREF_EA, is read from RDI_PCK and stored in the work memory 12 (S15). The optical disk recording/reproduction apparatus A having a conversion function generates the conversion information and other information necessary to create NV_PCK (S16), thereby creating NV_PCK data in the work memory 12 (S17).

The PCK data obtained by conversion is recorded on the optical disk D via the ATAPI controller 60 (S18). The main MPU 10 determines whether or not any one of all the packs has been subjected to format conversion (S19). If one or more non-converted packs remain (YES at S19), the MPU returns to the step S12, thereby executing format conversion on the next pack.

After all the packs are subjected to format conversion (NO at step S19), the format conversion process is finished.

Similarly, the optical disk recording/reproduction apparatus A having an editing function executes the editing process. In other words, the apparatus A reads editing information in which the conversion information is inserted, and uses it to execute speedy and accurate editing process.

Second Embodiment

A second embodiment differs from the first embodiment in that, in the former, the conversion information used for format conversion and the editing information used for editing process, in which the invention is characterized, are provided outside a video information stream.

FIG. 5 shows a file structure example. In the VR-standard case of FIG. 5, file ORG_MNGR 106 is provided under Root 101, in addition to standard file DVD_RTRAV 102, and file ORG_MNGR.IFO 107 is provided under the file ORG_MNGR 106. The file ORG_MNGR.IFO 107 contains the conversion information and editing information.

Further, no data is stored in files VR_MANGR.IFO 103, VR_MANGR.VRO 104 and VR_MANGR.BUP 105, which are provided under the standard file DVD_RTRAV 102.

Thus, the conversion information and editing information are provided outside the standard data stream, which means that the influence upon the reproduction of the stream can be completely eliminated.

To provide a file outside the standard data stream, the main MPU 10 of the optical disk recording/reproduction apparatus A of FIG. 1 beforehand executes necessary setting in the MPEG encoder 29. Upon receiving an instruction to start recording, the MPEG encoder 29 stores, at regular intervals, necessary information into the SDRAM 30 in accordance with the set parameters, and informs the main MPU 10 of the interruption process. The main MPU 10 informed of the interruption process fetches necessary information from the SDRAM 30 and stores it into the work memory 12. When the information stored in the work memory 12 reaches a predetermined amount, it is recorded in a predetermined format on the storage areas of the hard disk drive HD and optical disk D via the file system.

As described above, in the invention, video data, for example, recorded on a DVD-RAM on the basis of the VR standard is subjected to format conversion for converting the VR standard to the V standard, so as to enable the video data to be reproduced by a usual DVD player. To facilitate the format conversion process, for example, the final addresses VOBU_2NDREF_EA and VOBU_3RDREF_EA of the second and third reference pictures of RDI, which require a large amount of calculation for conversion, are inserted into video information as prior data and recorded on, for example, an optical disk.

Moreover, in the invention, video information with conversion information necessary for format conversion is subjected to format conversion. This enables VR-standard video data to be converted into V-standard video data in a practical time period. If someone executes, using their own editing apparatus, format conversion on V-standard video data concerning, for example, a wedding ceremony obtained by a digital video camera, and downloads the resultant video data (V standard) to a plurality of DVD-Rs, the video data, which can be reproduced by a usual DVD player, can be distributed to their acquaintances.

What is claimed is:

1. An information processing apparatus which inserts conversion information, used for conversion of a DVD-Video-Recording format into a DVD-Video format, into predetermined information, when recording the predetermined information as video information based on the DVD-Video-Recording format, the information processing apparatus comprising:

an encoder configured to encode the predetermined information into first video information based on the DVD-Video-Recording format;

an insertion section configured to insert the conversion information used to encode the first video information into second video information based on the DVD-Video format into the first video information encoded by the encoder, the inserted conversion information including at least one of MNF_ID as a flag indicative of whether or not the conversion information or editing information exists, VERSION indicative of a type of the conversion information, VOBU_2NDREF_EA as a final address of a second reference picture, VOBU_3RDREF_EA as a final address of a third reference picture, and VOBU_A_SYNCA as an address of A_PCK containing an audio frame to be reproduced immediately after a video start time; and a recording section which records the first video information, in which the conversion information is inserted by the insertion section, on a storage area of an information recording medium.

2. The information processing apparatus according to claim 1, wherein insertion section inserts all of said MNF_ID, said VERSION, said VOBU_2NDREF_EA, said VOBU_3RDREF EA, and said VOBU_A_SYNCA into the first video information.

3. The information processing apparatus according to claim 1, wherein the insertion section inserts the conversion information outside a data stream of the first video information.

4. The information processing apparatus according to claim 1, wherein the insertion section inserts the conversion information corresponding to the DVD-Video-Recording format into the first video information in the form of MNFI of RDI_PCK.

5. The information processing apparatus according to claim 1, wherein the insertion section inserts the conversion information into the first video information in the form of a file other than a file contained in a DVD_RTAV folder.

6. An information processing apparatus which converts video information based on a DVD-Video Recording format into video information based on a DVD-Video format with reference to conversion information inserted in the video information based on the DVD-Video Recording format, the information Processing apparatus comprising:

an extraction section configured to extract the conversion information from the first video information in which the conversion information is inserted based on the DVD-Video Recording format, the conversion information including at least one of MNF_ID as a flag indicative of whether or not the conversion information or editing information exists, VERSION indicative of a type of the conversion information, VOBU_2NDREF_EA as a final address of a second reference picture, VOBU_3RDREF_EA as a final address of a third reference picture, and VOBU_A_SYNCA as an address of A_PCK containing an audio frame to be reproduced immediately after a video start time; and a conversion section configured to convert the first video information into second video information based on the DVD-Video format, with reference to the conversion information extracted by the extraction section.

7. The information processing apparatus according to claim 6, wherein the extracting means extracts from the first video information all of said MNF_ID, said VERSION, said VOBU_2NDRBF_EA, said VOBU_3RDRBF_EA, and said VOBU_A_SYNCA.

8. The information processing apparatus according to claim 6, wherein the extracting means extracts the conversion information which is inserted as a file outside a data stream.

* * * * *